United States Patent [19]

Ejiri et al.

[11] Patent Number: 4,828,903

[45] Date of Patent: May 9, 1989

[54] MAGNETIC RECORDING DISK

[75] Inventors: Kiyomi Ejiri; Shigeo Komine, both of Odawara, Japan

[73] Assignee: Fuji Photo Film Co., Ltd., Kanagawa, Japan

[21] Appl. No.: 111,118

[22] Filed: Oct. 21, 1987

Related U.S. Application Data

[63] Continuation of Ser. No. 848,041, Apr. 4, 1986, abandoned.

[30] Foreign Application Priority Data

Apr. 4, 1985 [JP] Japan ................................ 60-72214

[51] Int. Cl.$^4$ ............................................. G11B 5/70
[52] U.S. Cl. .................................... 428/141; 427/131; 428/336; 428/694; 428/900
[58] Field of Search ............... 428/694, 900, 141, 336; 427/131; 360/135

[56] References Cited

U.S. PATENT DOCUMENTS

| 4,450,199 | 5/1984 | Tadokoro et al. | 360/135 |
| 4,451,531 | 5/1984 | Isobe et al. | 428/694 |
| 4,497,865 | 2/1985 | Minami et al. | 428/694 |
| 4,537,833 | 8/1985 | Kasuga et al. | 360/135 |
| 4,701,364 | 10/1987 | Miyoshi et al. | 428/694 |

Primary Examiner—Paul J. Thibodeau
Attorney, Agent, or Firm—Gerald J. Ferguson, Jr.

[57] ABSTRACT

A magnetic recording disk comprising a nonmagnetic support and magnetic recording layers provided on both surfaces of said support, said magnetic recording layers comprising a ferromagnetic metal powder dispersed in a binder, which is characterized in that:

said disk has a thickness in the range of 20–60 μm and a flexural stiffness in the range of 2.0–200 g·mm;

and each of said magnetic recording layers has a center line average height of not more than 0.03 μm.

5 Claims, No Drawings

MAGNETIC RECORDING DISK

This application is a continuation of Ser. No. 848,041, filed Apr. 4, 1986, now abandoned.

BACKGROUND OF THE INVENTION

1. Field of the invention

The present invention relates to a magnetic recording disk, and more particularly to a magnetic recording disk which is improved in both the electromagnetic conversion characteristics and the rotational properties.

2. Description of prior arts

A magnetic recording disk has been recently employed as a recording medium for a computer or a word processer. With the practical use of an electronic camera in recent years, the magnetic recording disk (i.e., magnetic sheet disk) of small size is standardized and has been employed as a recording medium for the electronic camera.

The magnetic recording disk basically comprises a nonmagnetic support and two magnetic recording layers provided on both surfaces of the support, and has a similar construction of layers to that of a magnetic recording medium in the form of tape (i.e., a magnetic recording tape) from the viewpoint that one of the magnetic recording layers is provided on the nonmagnetic support. However, as for various properties such as the running (i.e., rotational) properties, the magnetic recording disk is much highly required as compared with the magnetic recording tape.

In more detail, as for the magnetic recording disk, a magnetic head runs repeatedly on the same surface of the disk in contact with the surface of the disk to regenerate information. While the magnetic recording tape is kept in contact with the magnetic head by providing a certain level of tension to the tape, the recording disk is rotated under pressing the surface thereof against the magnetic head to record and regenerate information. Accordingly, the contact conditions between the disk and the magnetic head largely depend upon a flexural stiffness (flexural strength) of the magnetic recording disk. From the viewpoint of satisfactory contact between the disk and the magnetic head, the flexural stiffness of the disk preferably is high. However, if the flexural stiffness is too high, the magnetic head is harshly abraded and at the same time, the magnetic recording layer is liable to be damaged. Particularly, a variety of materials of the magnetic head have been developed recently, and a magnetic head using a material having low hardness such as a sendust head has been employed in place of a conventional ferrite head. In the case of using such magnetic head, the above-mentioned drawbacks are prominently observed.

At present, recording media are under requirement for increase of the recording density, and this requirement is also applied to the magnetic recording disk. Moreover, the magnetic recording disk needs to be further improved in the electromagnetic conversion characteristics as compared with a magnetic recording tape.

Since the magnetic sheet disk especially for an electronic camera or for a device of converting a photographic silver halide image to electromagnetic information is required to show high resolution almost the same as that of the conventional photography using silver salt, the electromagnetic conversion characteristics thereof are particularly required to be highly enhanced.

As a measure for improving the elctromagnetic conversion characteristics of the magnetic sheet disk for an electronic camera, Japanese Patent Provisional Publication No. 58(1983)-122623 proposes a magnetic sheet disk using a ferromagnetic metal powder as magnetic powder and being provided with a magnetic recording layer on a support of smaller thickness than that of the conventional disk. The ferromagnetic metal powder shows excellent electromagnetic conversion characteristics, and hence it is suitable as a magnetic powder to be employed for a magnetic sheet disk for use in an electronic camera or in the image conversion device.

SUMMARY OF THE INVENTION

It is an object of the present invention to provide a magnetic recording disk using a ferromagnetic metal powder as magnetic powder, which is improved in the electromagnetic conversion characteristics and gives less abrasion on a magnetic head to be employed with the disk, as compared with the conventional magnetic recording disk.

Particularly, the invention has an object to provide a magnetic recording disk suitable as magnetic sheet disk to be employed in a electronic camera or the image conversion device.

There is provided by the present invention a magnetic recording disk comprising a nonmagnetic support and magnetic recording layers provided on both surfaces of said support, said magnetic recording layers comprising a ferromagnetic metal powder dispersed in a binder, which is characterized in that:

said disk has a thickness in the range of 20–60 μm and a flexural stiffness in the range of 2.0–200 g·mm, preferably 2.1–162 g·mm;

and each of said magnetic recording layers has a center line average height (Ra) of not more than 0.03 μm.

The magnetic recording disk of the present invention employs a ferromagnetic metal powder as magnetic powder and is improved in the electromagnetic conversion characteristics as compared with the conventional one. Moreover, the magnetic recording disk of the invention gives less abrasion on a magnetic head employed in the magnetic recording and regenerating operations than the conventional magnetic recording disk. Accordingly, a magnetic recording disk of the invention is particularly suitable as magnetic sheet disk employable for an electronic camera or the image conversion device.

DETAILED DESCRIPTION OF THE INVENTION

A conventional magnetic recording disk is generally prepared by providing magnetic recording layers on both surfaces of a support in the form of sheet or film according to a known coating method. The magnetic recording disk of the present invention can be prepared by a method similar to the known method.

The magnetic recording disk of the invention employs a ferromagnetic metal powder as magnetic powder, and has a thickness of specific range (20–60 μm) and a flexural stiffness of specific range (2.0–200 g·mm).

The magnetic recording disk of the invention having the above-mentioned thickness and flexural stiffness can be prepared, for instance, in the manner described below.

A nonmagnetic support of the magnetic recording disk according to the invention is not particularly limited and can be selected, for example, from films or sheets of synthetic resins such as polyethylene terephthalate, polypropylene, polycarbonate, polyethylene naphthalate, polyamide, polyamideimide, polyimide and metallic foils such as aluminum foil and stainless steel foil.

The thickness of the nonmagnetic support is preferably within the range of 10–55 μm.

On both surfaces of the support are provided magnetic recording layers containing a ferromagnetic metal powder as magnetic powder. Prior to formation of the magnetic recording layer on the support surface, the support surface may be subjected to treatment for making the support hydrophilic or may be provided with an adhesive layer.

In the magnetic recording disk of the invention, the ratio between the thickness of the nonmagnetic support and the total thickness of both magnetic recording layers is preferably within the range of from 4:1 to 15:1.

The magnetic recording layer of the magnetic recording disk of the invention comprises a ferromagnetic metal powder dispersed in a binder.

The ferromagnetic metal powder to be contained in the magnetic recording layer of the magnetic recording disk according to the invention preferably has a specific surface area (S-BET) of 35–65 m$^2$/g.

As the ferromagnetic metal powder, there can be mentioned a ferromagnetic metal powder containing a metal component of at least 75 wt.% in which at least 80 wt.% of the metal component comprises at least one ferromagnetic metal or metal alloy (e.g., Fe, Co, Ni, Fe—Co, Fe—Ni, Co—Ni, or Co—Ni—Fe) and the remaining metal component, if present, comprises other atoms(s) (e.g., Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, or P). The ferromagnetic metal component may contain a small amount of water, hydroxide, or oxide. These ferromagnetic metal powders can be prepared by known methods. The ferromagnetic metal powder employable in the invention can be obtained by first preparing a ferromagnetic metal powder according to the known method, then adjusting the saturation magnetic moment and finally classifying the resulting powder based on the powder size. The saturation magnetic moment can be adjusted by a known method such as a method of varying the oxidation state of the surface of the ferromagnetic alloy powder or a method of varying the composition of alloy.

There is no specific limitation on the shape of the ferromagnetic metal powder employable in the invention, and normally used is needle shape, grain shape, dice shape, rice shape or plate shape.

The binder employable in the formation of the magnetic recording layer of the invention can be selected from known resins. Examples of the resins include vinyl chloride/vinyl acetate copolymer resins, cellulose derivative resins, vinylidene chloride resins, polyester resins, acrylic resins, polyvinyl acetal resins, polyvinyl butylate resins, phenoxy resins, epoxy resins, butadiene/acrylonitrile copolymer resins, polyurethane resins and urethane epoxy resins. These resins can be employed singly or in combination. As well as the above-mentioned resins, a hardening agent such as a polyisocyanate compound is preferably contained in the magnetic recording layer.

The magnetic recording layer of the magnetic recording disk according to the invention may contain a non-magnetic inorganic powder (e.g., α-Fe$_2$O$_3$, SiC and α-Al$_2$O$_3$), carbon black, a variety of dispersing agents, a lubricant or the like, in addition to the ferromagnetic metal powder and the binder.

The magnetic recording disk of the present invention can be produced by the following procedure.

In the first place, the above-described components are dispersed in a volatile solvent to prepare a magnetic paint (or a coating dispersion) for the preparation of a magnetic recording layer. The magnetic paint is applied simultaneously or individually onto both surfaces of the aforementioned nonmagnetic support to form coating layers of magnetic paint. The coating layers of magnetic paint are subjected to a treatment of random orienting of the ferromagnetic metal powder in magnetic field before the drying of the coated magnetic paint is finished, and then dried completely to prepare magnetic recording layers on both surfaces of the support. The coating layers of magnetic paint may be subjected no orienting treatment.

In the second place, the magnetic recording layers provided on both surfaces of the nonmagnetic support are subjected to a smoothing process such as a supercalendering so as to make the surfaces of the magnetic recording layers highly smooth. The magnetic recording medium having been subjected to these processes such as the smoothing process is subsequently cut to give a medium having a desired size in the form of disk.

The magnetic recording disk prepared as above is required to have a thickness within the range of 20–60 μm in order that the function of the resulting disk is maintained at a high level. When the thickness of the magnetic recording disk is less than 20 μm, the disk contacts with a magnetic head under unsatisfactory conditions. Moreover, since the thickness of magnetic recording layer necessarily becomes smaller as the thickness of the disk becomes smaller, the ferromagnetic metal powder contained in the magnetic layer is liable to be oriented in the direction of coating of the magnetic paint. As a result, a magnetic anisotropic ratio of the magnetic recording layer exceeds 10%, whereby the regeneration output is fluctuated widely in the regeneration procedure for the resulting magnetic recording disk. The magnetic anisotropic ratio of the magnetic recording layer will be described hereinafter in more detail. Further, a certain part of a magnetic head is extremely abraded (so-called partial abrasion) because the magnetic recording disk is brought into contact with the magnetic head in the distorted state caused by the high-speed rotational operation. When the thickness of the magnetic recording disk exceeds 60 μm, the stiffness of the disk becomes too high and accordingly the contact pressure between the disk and magnetic head becomes too high, resulting in occurrence of exceeding abrasion on the head.

The magnetic anisotropic ratio is determined by the following formula:

Magnetic Anisotropic Ratio
(%) = (Max − Min)/(Max + Min) × 100, in which Max means a maximum value of regeneration output of a magnetic recording disk, and Min means a minimum value of regeneration output of the same disk.

The magnetic recording disk of the invention has a flexural stiffness within the range of 2.0–200 g·mm. When theh flexural stiffness of the disk is less than 2.0 g·mm, the disk contacts unsatisfactorily with a magnetic head. When the flexural stiffness of the disk exceeds 200 g·mm, the magnetic head employed is harshly abraded.

In the magnetic recording disk of the invention, each of the magnetic recording layers has a center line average height (Ra) of not more than 0.03 μm. There is no specific limitation on the lowest value of the center line average height in the invention, but the lowest limit generally is approx. 0.01 μm from the viewpoint of practical productivity. The center line average height (Ra) is a value determined based on the cut-off value of 0.25 mm according to JIS-B-0601. When the center line average height of the magnetic recording layer is more than 0.03 μm, the abrasion on the magnetic head becomes harsh. In addition, between the magnetic recording layer and magnetic head is produced spacing loss, and hence the decrease of electromagnetic conversion characteristics of the resulting disk such as lowering of C/N ratio is brought about.

The magnetic recording disk comprising a magnetic recording layer which has a highly smooth surface defined in the invention can be prepared, for instance, by a method such as a surface smoothing process under the conditions as described below.

For instance, after applying the magnetic paint onto both surfaces of the nonmagnetic support, the surface smoothing process is carried out by utilizing a device equipped with plural metal rolls under such conditions that a rate for feeding film having dried layers of magnetic paint is 40–80 m/min., a linear pressure between the metal rolls where the film finally passes through is 100–300 kg/cm, and a temperature for heating the metal rolls is not lower than 75° C.

The examples and the comparison examples of the present invention are given below. In the following examples, the expression "parts" means "parts by weight", unless otherwise specified.

EXAMPLES 1–3 AND COMPARISON EXAMPLES 1–2

| | |
|---|---|
| Ferromagnetic alloy powder of needle shape (Fe—Ni alloy, Ni content: 5 wt. %, specific surface area (S-BET): 45 m$^2$/g) | 100 parts |
| Vinyl chloride/vinyl acetate copolymer | 10 parts |
| Polyurethane resin | 4 parts |
| α-Al$_2$O$_3$ | 5 parts |
| Butyl stearate | 5 parts |
| Methyl ethyl ketone | 100 parts |
| Cyclohexanone | 100 parts |

The above-listed components were kneaded in a ball mill for 10 hours. To the mixture was added 7 parts of a polyisocyanate compound (trade name: Coronate L, available from Nippon Polyurethane Co., Ltd.) and the mixture was then kneaded for 30 min. Thus kneaded mixture was filtrated on a filter having a means pore diameter of 3 μm, to prepare a magnetic paint.

The magnetic paint was coated on both surfaces of polyethylene terephthalate films (nonmagnetic support, center line average height (Ra) of each surface: 0.015 μm) having thickness of 13 μm (Example 1), 32 μm (Example 2), 47 μm (Example 3), 7 μm (Comparison Example 1), and 67 μm (Comparison Example 2), so that each of the resultant magnetic recording layers would have thickness of 4 μm after being dried. The coating of the magnetic paint was carried out using a reverse roll. After the coating was complete, the magnetic recording layer provided on the support was subjected to drying and supercalendering. The supercalendering was carried out using a supercalendering device equipped with seven metal rolls under such conditions that the linear pressure between the metal rolls where the film having the magnetic recording layers would finally pass through was 200 kg/cm, a feed rate of film was 60 m/min., and the temperature for heating the metal rolls was 85° C.

From the obtained magnetic recording sheet was then stamped out a disk having a diameter of 47 mm to prepare magnetic recording disks having different thickness set forth in Table 1. Each of the magnetic recording disks was encased in a plastic case to obtain a magnetic sheet disk.

The magnetic sheet disks obtained as above were measured on the center line average height of their magnetic recording layers and the flexural stiffness thereof, and then evaluated on the abrasion caused on a magnetic head and magnetic anisotropic ratio according to the following tests.

ABRASION ON MAGNETIC HEAD

The obtained magnetic sheet disk was rotated at a rate of 3,600 rpm in a magnetic sheet disk recorder produced by way of trial which was equipped with a sendust head as a magnetic head. A signal of 7 MHz was recorded at 40 mA and regenerated under rotation of the disk for 100 hours to measure amount of abrasion on the magnetic head. The pressure on the magnetic head was set in such a manner that the magnetic anisotropy would affect the regeneration at the lowest level. The track width was set to 60 μm.

MAGNETIC ANISOTROPIC RATIO

The maximum value and minimum value of the regeneration output of the obtained disk were measured using the above-mentioned disk recorder under the same conditions as described above. The measured values were processed by the aforementioned formula to determine the magnetic anisotropic ratio of the obtained magnetic sheet disk.

The center line average height of the magnetic recording layer of the magnetic sheet disk prepared as above was a means value of values measured by the use of a three-dimentional measuring apparatus (trade name: SE-3AK, manufactured by Kosaka Laboratory Co., Ltd.).

The flexural stiffness was determined by the following formula:

$$\text{Flexural Stiffness (g·mm)} = \text{Flexural Modulus (kg/mm}^2\text{)} \times \text{Thickness } [(\mu m)^3]$$

The results are set forth in Table 1.

TABLE 1

| | Thickness (μm) | Flexural Stiffness (g · mm) | Center Line Average Height (μm) | Abrasion (μm) | Magnetic Anisotropic Ratio (%) |
|---|---|---|---|---|---|
| Example 1 | 21 | 2.5 | 0.012 | 6 | 7.5 |
| Example 2 | 40 | 28.8 | 0.015 | 5 | 5.0 |
| Example 3 | 55 | 124 | 0.014 | 8 | 4.0 |

TABLE 1-continued

|  | Thickness (μm) | Flexural Stiffness (g · mm) | Center Line Average Height (μm) | Abrasion (μm) | Magnetic Anisotropic Ratio (%) |
| --- | --- | --- | --- | --- | --- |
| Com. Example 1 | 15 | 0.62 | 0.014 | 13 | 21.0 |
| Com. Example 2 | 75 | 380 | 0.015 | 12 | 16.0 |

As is evident from the results set forth in Table 1, the magnetic sheet disks having the thickness and flexural stiffness defined in the invention (Examples 1 to 3) showed less abrasion on the magnetic head and lower magnetic anisotropic ratio than the magnetic sheet disks prepared in Comparison Examples. Further, the disks of the invention showed excellent electromagnetic conversion characteristics. The magnetic sheet disk having small thickness (Comparison Example 1) was distorted in its shape, and hence harsh abrasion was caused on a certain part of the magnetic head. Thus, partial abrasion took place on the magnetic head. When the thickness of the magnetic recording disk was too large (namely, in the case of Comparison Example 2), the flexural stiffness became too high to cause large abrasion on the head.

EXAMPLES 4–6 AND COMPARISON EXAMPLE 3

The procedure of Example 1 was repeated except for applying the magnetic paint onto both surfaces of a polyethylene terephthalate film (center line average height (Ra) of each surface: 0.015 μm) having the thickness of 32 μm so that each of the resultant magnetic recording layers would have thickness of approx. 4 μm after being dried, followed by supercalendering at a temperature of 85° C. (Example 4), 80° C. (Example 5), 75° C. (Example 6) and 70° C. (Comparison Example 3), to prepare magnetic sheet disks. The temperature in the supercalendering procedure varied in these examples, and hence the resultant magnetic recording disks had various thickness set forth in Table 2.

The thickness, flexural stiffness, center line average height (Ra) of the magnetic recording layer, abrasion on magnetic head and C/N ratio for the obtained magnetic recording disks are set forth in Table 2.

The flexural stiffness, Ra of the magnetic recording layer and abrasion on the magnetic head were measured according to the aforementioned tests. The C/N ratio was determined by the method described below.

C/N RATIO

A signal of 7 MHz was recorded at 40 mA in a magnetic sheet disk recorder under the same conditions as described above and regenerated, to determine the C/N ratio.

TABLE 2

|  | Thickness (μm) | Flexural Stiffness (g · mm) | Center Line Average Height (μm) | Abrasion (μm) | C/N Ratio (dB) |
| --- | --- | --- | --- | --- | --- |
| Example 4 | 39.5 | 28.3 | 0.015 | 6 | 52 |
| Example 5 | 41.0 | 32.4 | 0.021 | 5 | 52 |
| Example 6 | 40.7 | 31.0 | 0.028 | 8 | 50.2 |
| Com. Example 3 | 40.0 | 28.8 | 0.037 | 16 | 47.0 |

As is evident from the results set forth in Table 2, the magnetic sheet disks comprising a magnetic recording layer which had the cetner line average height defined in the invention (Examples 4 to 6) gave less abrasion on the magnetic head and showed high C/N ratio. In other words, the magnetic sheet disks of the invention were excellent both in the rotational properties and the electromagnetic conversion characteristics as compared with the conventional sheet disk (Comparison Example 3).

We claim:

1. A magnetic recording disk comprising a non-magnetic support and magnetic recording layers provided on both surfaces of said support, said magnetic recording layers comprising a ferromagnetic metal powder dispersed in a binder, which is characterized in that:
   said disk has a thickness in the range of 20–60 μm and a flexural stiffness in the range of 2.0–200 g·mm;
   said non-magnetic support has a thickness in the range of 10-55 μm; and
   each of said magnetic recording layers has a center line average height of from 0.01 to 0.03 μm.

2. The magnetic recording disk as claimed in claim 1, wherein the ratio between the thickness of said nonmagnetic support and the total thickness of both magnetic recording layers ranges from 4:1 to 15:1.

3. The magnetic recording disk as claimed in claim 1, wherein said nonmagnetic support is a polyethylene terephthalate film.

4. The magnetic recording disk as claimed in claim 1, wherein the flexural stiffness of said disk ranges from 2.1 to 162 g·mm.

5. The magnetic recording disk as claimed in any claim of claims 1, 2, 3 and 4, wherein each of said magnetic recording layers has a magnetic anisotropic ratio of not more than 10%.

* * * * *